US012607378B2

(12) United States Patent
Mou et al.

(10) Patent No.: US 12,607,378 B2
(45) Date of Patent: Apr. 21, 2026

(54) SYSTEM FOR DETECTING, POSITIONING, AND CLEANING INDOOR AIR POLLUTION

(71) Applicant: MICROJET TECHNOLOGY CO., LTD., Hsinchu City (TW)

(72) Inventors: Hao-Jan Mou, Hsinchu City (TW);
Chin-Chuan Wu, Hsinchu City (TW);
Yung-Lung Han, Hsinchu City (TW);
Chi-Feng Huang, Hsinchu City (TW)

(73) Assignee: MICROJET TECHNOLOGY CO., LTD., Hsinchu City (TW)

( * ) Notice: Subject to any disclaimer, the term of this patent is extended or adjusted under 35 U.S.C. 154(b) by 434 days.

(21) Appl. No.: 18/192,076

(22) Filed: Mar. 29, 2023

(65) Prior Publication Data

US 2024/0027090 A1 Jan. 25, 2024

(30) Foreign Application Priority Data

Jul. 20, 2022 (TW) .................................. 111127198

(51) Int. Cl.
*G01N 1/24* (2006.01)
*F24F 11/63* (2018.01)
(Continued)

(52) U.S. Cl.
CPC ................ *F24F 11/63* (2018.01); *G01N 1/24* (2013.01); *G05B 19/042* (2013.01); *F24F 8/108* (2021.01);
(Continued)

(58) Field of Classification Search
CPC ............... G01N 1/24; G01N 2001/245; G01N 33/0075; G05B 19/042; G05B 2219/2614;
(Continued)

(56) References Cited

U.S. PATENT DOCUMENTS 3,744,929 A * 7/1973 Huntington ........... F04D 29/282
                                                    416/145
3,972,697 A * 8/1976 Short, Jr. ............. B01D 53/501
                                                    96/228
(Continued)

FOREIGN PATENT DOCUMENTS

CN 108434927 A 8/2018
CN 111330367 A 6/2020
(Continued)

*Primary Examiner* — Scott T Baderman
*Assistant Examiner* — Mario M Velez-Lopez
(74) *Attorney, Agent, or Firm* — Birch, Stewart, Kolasch & Birch, LLP

(57) ABSTRACT

A system for detecting, positioning, and cleaning indoor air pollution includes one or more blade blowers widely configured in an indoor space to provide an air flow, to inhale a gas, and to collect an air pollution in the gas. The blade blower transmits the air pollution to one or more first devices which is physical-typed or chemical-typed through the air flow to detect and ensure a qualitative property, a concentration, and a location of the air pollution. A blower which is nearest to the location of the air pollution is enabled through a wireless network and artificial intelligent computation to generate a directed air flow. The directed air flow transfers the air pollution to pass through one or more second devices which is physical-typed, chemical-typed, or biological-typed to clean the air pollution.

18 Claims, 16 Drawing Sheets

(51) Int. Cl.
| | | |
|---|---|---|
| *G05B 19/042* | (2006.01) | |
| *F24F 8/108* | (2021.01) | |
| *F24F 8/158* | (2021.01) | |
| *F24F 8/22* | (2021.01) | |

(52) U.S. Cl.
CPC ................. *F24F 8/158* (2021.01); *F24F 8/22* (2021.01); *G01N 2001/245* (2013.01); *G05B 2219/2614* (2013.01)

(58) Field of Classification Search
CPC .... F24F 11/63; F24F 2110/50; F24F 2110/66; F24F 2110/70; F24F 8/108; F24F 8/158; F24F 8/22
See application file for complete search history.

(56) References Cited

U.S. PATENT DOCUMENTS

| | | | | |
|---|---|---|---|---|
| 10,001,288 | B1 * | 6/2018 | Yang | F24F 11/79 |
| 11,649,977 | B2 * | 5/2023 | He | F24F 11/63 |
| | | | | 700/276 |
| 11,976,848 | B2 * | 5/2024 | Woods | F24F 8/22 |
| 2011/0303086 | A1 * | 12/2011 | Fujii | B03C 3/12 |
| | | | | 95/287 |
| 2015/0087222 | A1 * | 3/2015 | Li | F24F 7/08 |
| | | | | 454/338 |
| 2017/0082305 | A1 * | 3/2017 | Law | A61L 9/205 |
| 2017/0312557 | A1 * | 11/2017 | Schuller | A62B 7/10 |
| 2018/0202465 | A1 * | 7/2018 | Randall | B01D 46/10 |
| 2019/0289946 | A1 * | 9/2019 | Perusse | A62B 18/003 |
| 2019/0346417 | A1 * | 11/2019 | Benefield | F24F 11/58 |
| 2019/0381443 | A1 * | 12/2019 | Kim | G05B 19/042 |
| 2020/0224915 | A1 * | 7/2020 | Nourbakhsh | F24F 11/54 |
| 2020/0268927 | A1 * | 8/2020 | Asano | F24F 1/00 |
| 2021/0039112 | A1 * | 2/2021 | Naik | B03C 3/49 |
| 2021/0063036 | A1 * | 3/2021 | Oh | G06V 10/764 |
| 2021/0188050 | A1 * | 6/2021 | Mou | B01D 39/2055 |
| 2022/0196269 | A1 * | 6/2022 | Mou | F24F 8/30 |
| 2024/0151421 | A1 * | 5/2024 | Mou | F24F 8/108 |

FOREIGN PATENT DOCUMENTS

| | | |
|---|---|---|
| TW | 202224750 A | 7/2022 |
| TW | 202225612 A | 7/2022 |

* cited by examiner

322

3225a

3225b

3225

3224

3223c

3223b

3223

3223d

3223a

3222

3221a

3221

3221b

SYSTEM FOR DETECTING, POSITIONING, AND CLEANING INDOOR AIR POLLUTION

CROSS-REFERENCE TO RELATED APPLICATION

This non-provisional application claims priority under 35 U.S.C. § 119(a) to Patent Application No. 111127198 filed in Taiwan, R.O.C. on Jul. 20, 2022, the entire contents of which are hereby incorporated by reference.

BACKGROUND

Technical Field

The present invention relates to a system for detecting, positioning, and cleaning indoor air pollution, in particular, to a system adapted to be utilized in an indoor space to perform locating the air pollution, guiding the air pollution, and cleaning the air pollution.

Related Art

In light of people paying more and more attention to the ambient air quality in daily life, it is noted that the particulate matters (PM1, PM2.5, PM10), carbon dioxide, total volatile organic compounds (TVOC), formaldehyde and even particulates, aerogels, bacteria, viruses contained in the air might affect the human health, even might be life-threatening when exposure to these gases.

However, currently, it is not easy to control the indoor air quality since the affecting factors of the indoor air quality include not only the outdoor space air quality but also the air conditioning and the pollution sources in the indoor space (especially the dusts originated from poor circulation of air in the indoor space). Therefore, the air conditioners or air cleaners are utilized for improving the indoor air quality.

Consequently, it is an issue of the present invention for intelligently and rapidly detecting the indoor air pollution source thereby effectively removing the air pollution from the indoor space, monitoring the air quality of the indoor space whenever and wherever possible, making the air into a safe and breathable state while the air quality in the indoor space is lowering than a default standard, and generating an air convection intelligently to detect and locate the air pollution rapidly and to effectively control a plurality of filtering devices which are physical-typed or chemical-typed or biological-type to perform an intelligent air convection to accelerate the air pollution to be filtered, so that positioning the air pollution, guiding the air pollution, and cleaning the air pollution can be achieved, allowing the air pollution in the indoor space to be cleaned to a safe and breathable state.

SUMMARY

The present invention provides a system for detecting, positioning, and cleaning indoor air pollution. Since the air pollution in the indoor space is occurring and moving any time, a plurality of gas detection devices being physical-typed or chemical-typed is widely configured in the indoor space to ensure the qualitative property, the concentration, and the location of the air pollution. Moreover, a cloud device is connected to the gas detection devices through wired or wireless connection to perform mathematical computation and artificial intelligent computation to ensure the location of the air pollution, the cloud device intelligently and selectively transmits a control command to enable a physical-typed, chemical-typed, or biological-typed filtering device which is nearest to the location of the air pollution to generate an air flow, so that the air pollution is guided to the filtering device for being filtered and cleaned, and therefore positioning the air pollution, guiding the air pollution, and cleaning the air pollution can be achieved, allowing the air pollution in the indoor space to be cleaned to a safe and breathable state.

In order to accomplish the above object(s), in the general embodiment of the present invention, a system for detecting, positioning, and cleaning indoor air pollution includes widely configuring at least one blade blower in an indoor space to provide an air flow, to inhale a gas, and to collect an air pollution in the gas, wherein the at least one blade blower transmits the air pollution to at least one first device which is physical-typed or chemical-typed through the air flow to detect and ensure a qualitative property, a concentration, and a location of the air pollution; enabling a blower which is nearest to the location of the air pollution through a wireless network and artificial intelligent computation to generate a directed air flow, wherein the directed air flow transfers the air pollution to pass through at least one second device which is physical-typed, chemical-typed, or biological-typed to clean the air pollution.

BRIEF DESCRIPTION OF THE DRAWINGS

The invention will become more fully understood from the detailed description given herein below, the illustration is only for describing and thus not limitative of the invention, wherein.

DETAILED DESCRIPTION

The present invention will now be described more specifically with reference to the following embodiments. It is to be noted that the following descriptions of different embodiments of this invention are presented herein for purpose of illustration and description only, and it is not intended to limit the scope of the present invention.

Figure 1:
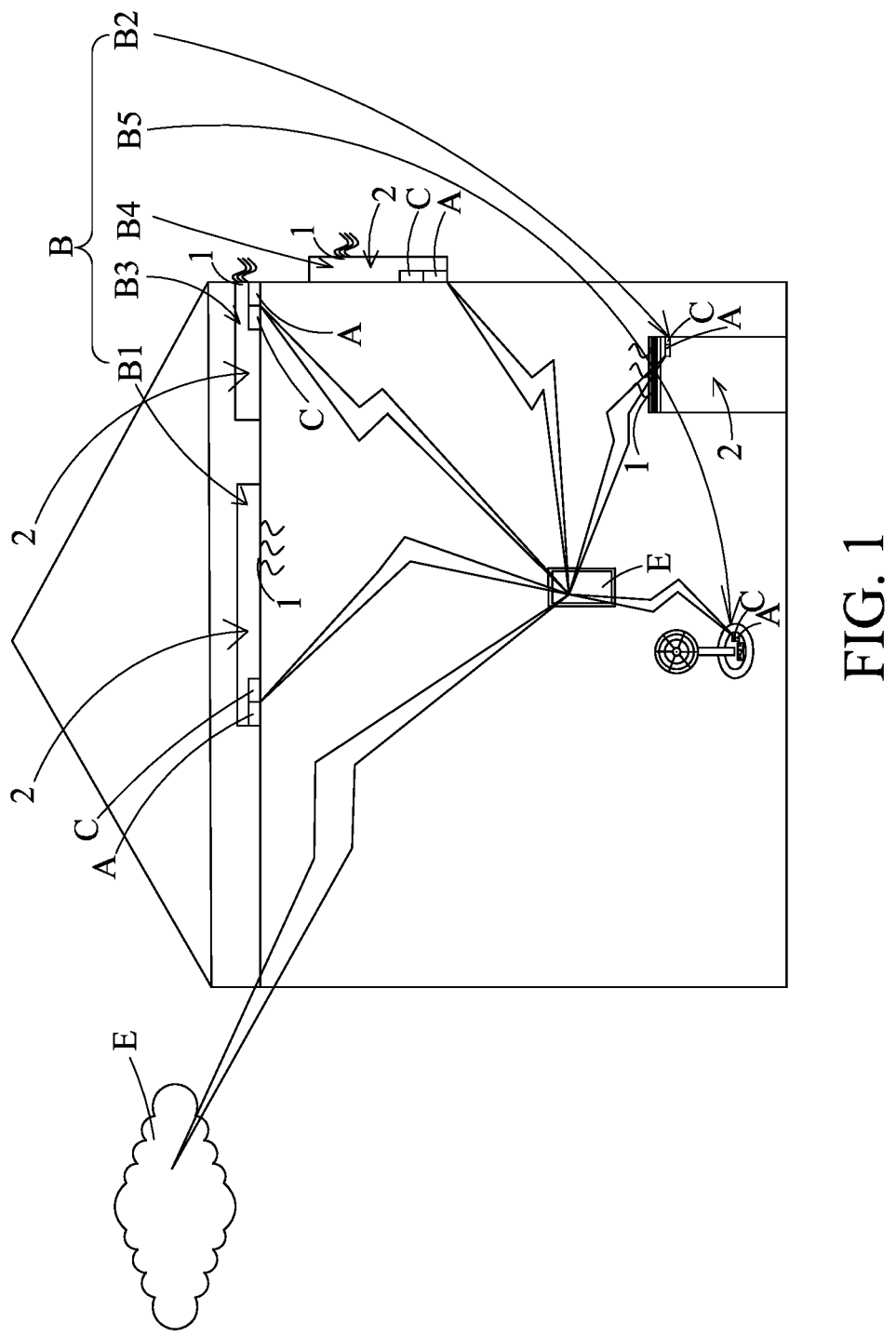
FIG. 1 illustrates a schematic view showing the operation of a system for detecting, positioning, and cleaning indoor air pollution of an exemplary embodiment in the present invention, wherein the system is utilized in an indoor space.
Figure 2:
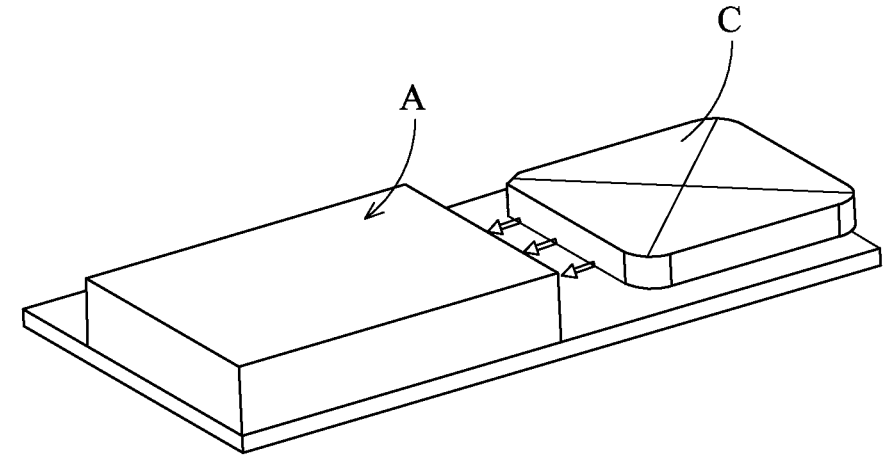
FIG. 2 illustrates a schematic view of the system for detecting, positioning, and cleaning indoor air pollution of the exemplary embodiment in the present invention, showing the configuration of the gas detection device of the first device which is physical-typed or chemical-typed and a blade blower.

Please refer to FIG. 1 and FIG. 2, according to one or some embodiments of the present invention, a system for detecting, positioning, and cleaning indoor air pollution includes at least one blade blower C widely configured in an indoor space to provide an air flow, continuously inhale gas, and collect an air pollution in the gas at any time. Also, the at least one blade blower C transmits the air pollution to at least one first device which is physical-typed or chemical-typed in the indoor space through the air flow to detect and ensure a qualitative property, a concentration, and a location of the air pollution. Moreover, it should be noted that, in embodiments of the present invention, the blade blower C is an axial flow fan, a vortex fan, or a blade blower C comprising an electric motor and blades. In addition, it should be noted that, in embodiments of the present invention, the first device which is physical-typed or chemical-typed a gas detection device A, but the present invention is not limited thereto, thus any of detection devices capable of detecting the particles, the qualitative property, and the concentration of the gas would belong to an extended implementation of the gas detection device A.

Figures 3A, 3B:
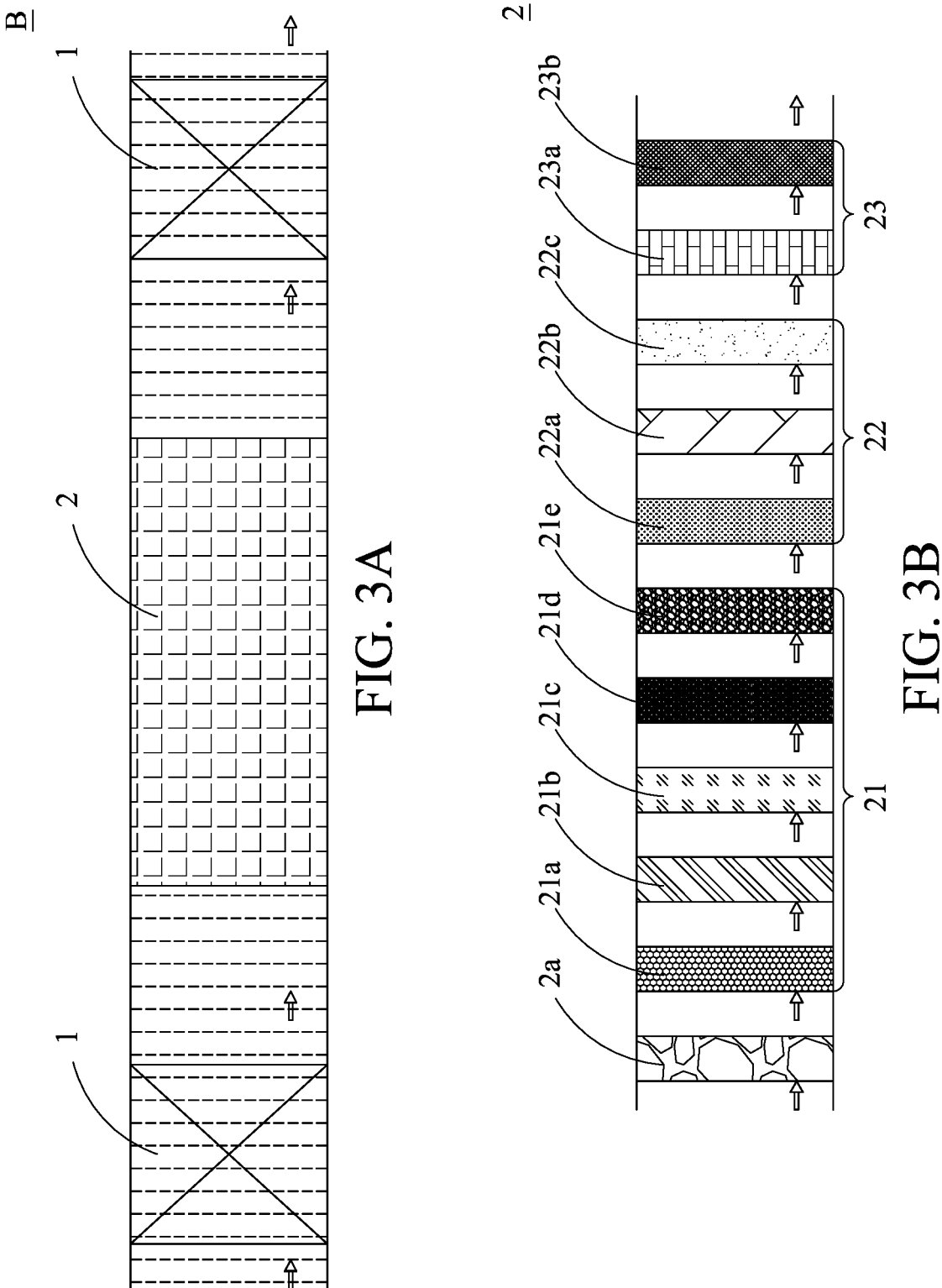
FIG. 3A illustrates a schematic view of the system for detecting, positioning, and cleaning indoor air pollution of the exemplary embodiment in the present invention, showing the configuration of the blower and the filtering unit of the second device which is physical-typed or chemical-typed or biological-typed are shown.
FIG. 3B illustrates a schematic view of the filtering unit of the second device which is physical-typed, chemical-typed or biological-typed.
Figure 4A:
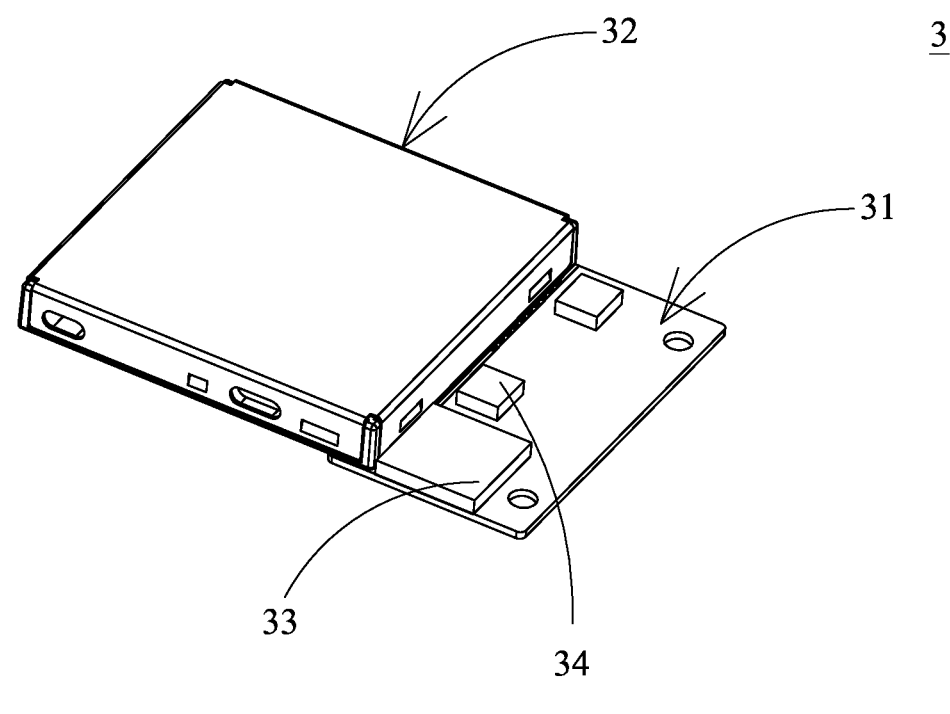
FIG. 4A illustrates a perspective view of a gas detection device of the system for detecting, positioning, and cleaning indoor air pollution of the exemplary embodiment in the present invention.
Figure 4B:
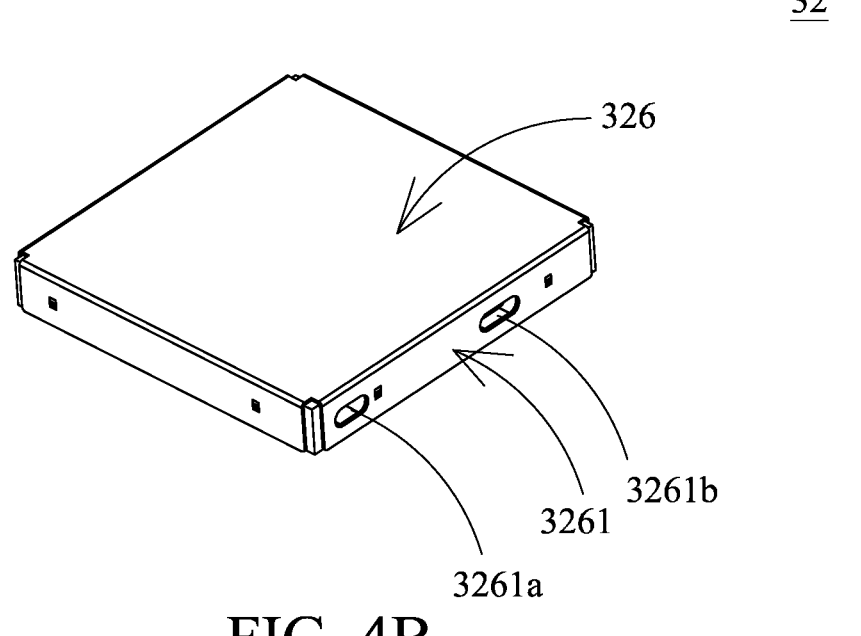
FIG. 4B illustrates a perspective view (1) of a gas detection main body of the system for detecting, positioning, and cleaning indoor air pollution of the exemplary embodiment in the present invention.
Figure 4C:
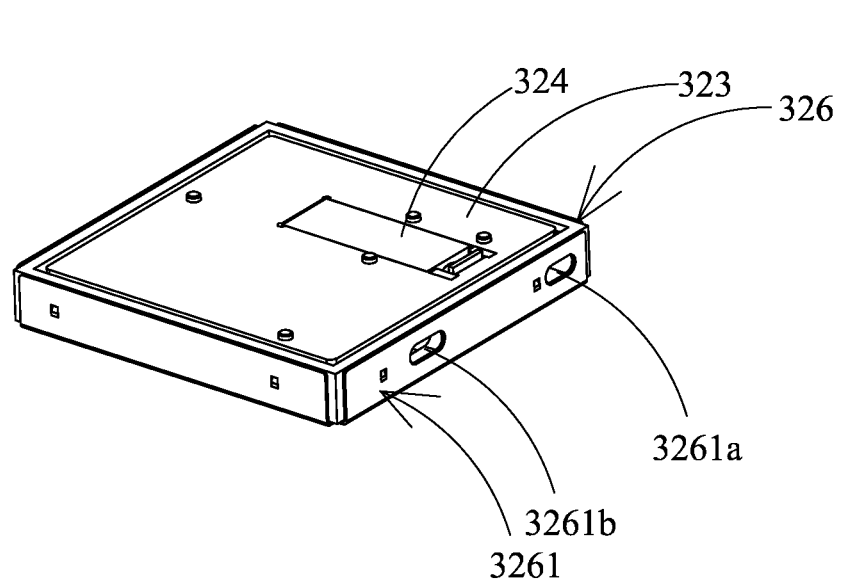
FIG. 4C illustrates a perspective view (2) of the gas detection main body of the system for detecting, positioning, and cleaning indoor air pollution of the exemplary embodiment in the present invention.
Figure 4D:
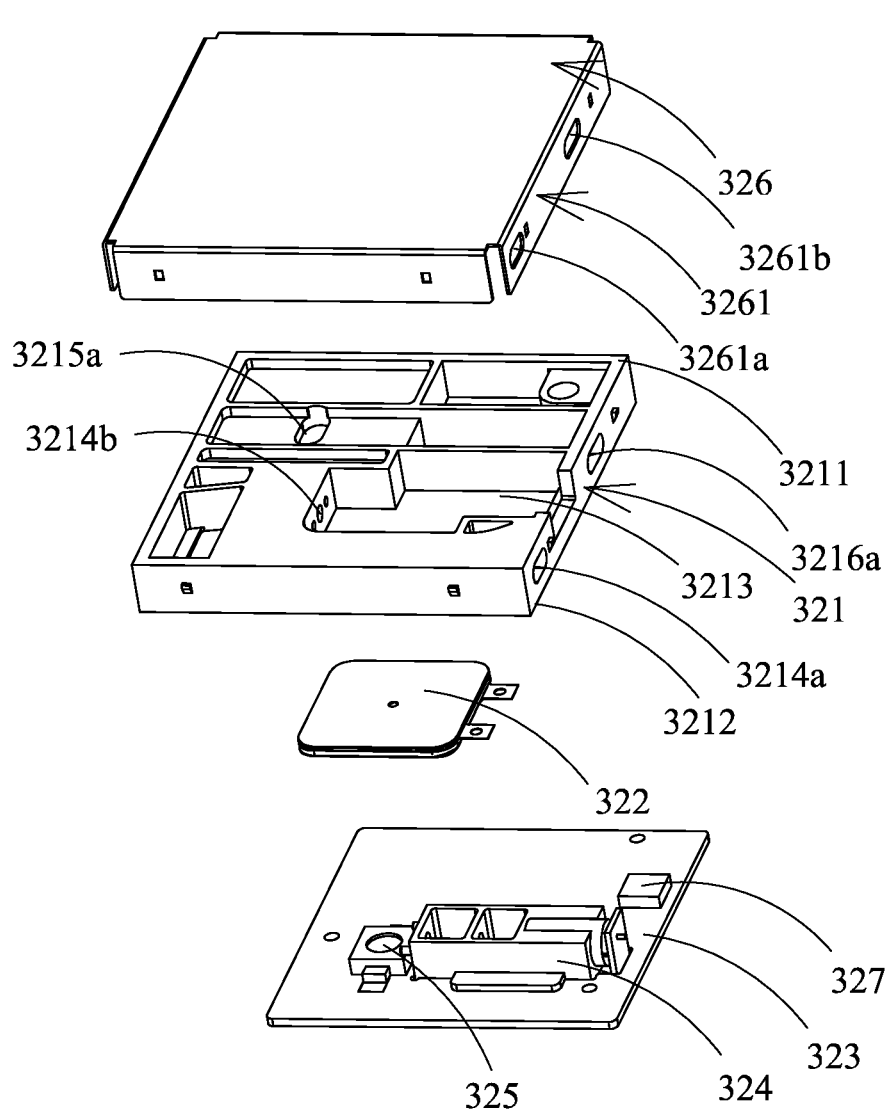
FIG. 4D illustrates an exploded view of the gas detection device of the system for detecting, positioning, and cleaning indoor air pollution of the exemplary embodiment in the present invention.
Figure 5A:
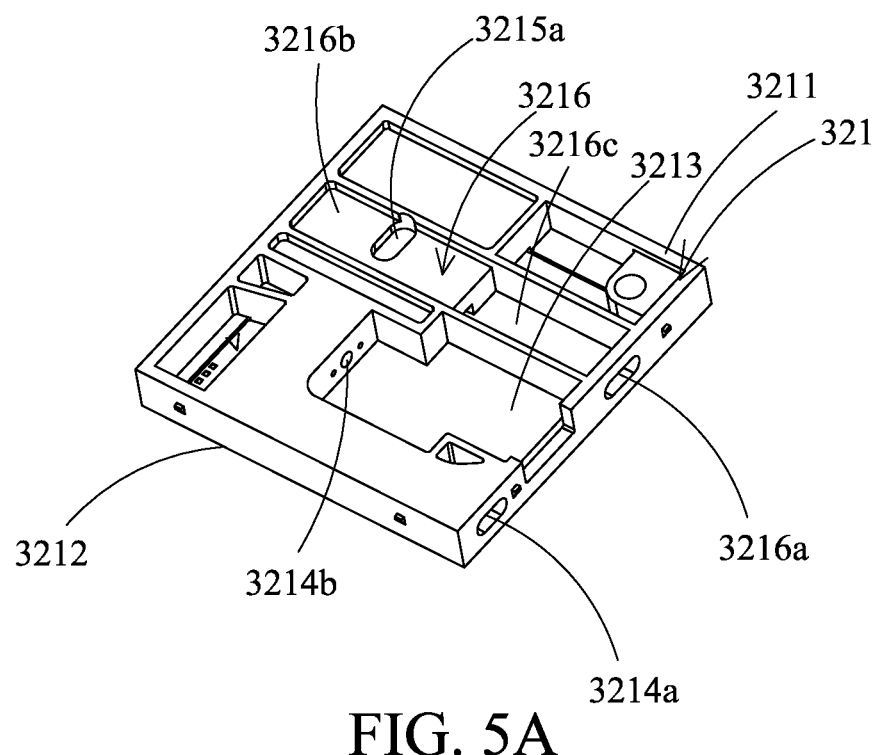
FIG. 5A illustrates a perspective view (1) of a base of the gas detection device of the system for detecting, positioning, and cleaning indoor air pollution of the exemplary embodiment in the present invention.
Figure 5B:
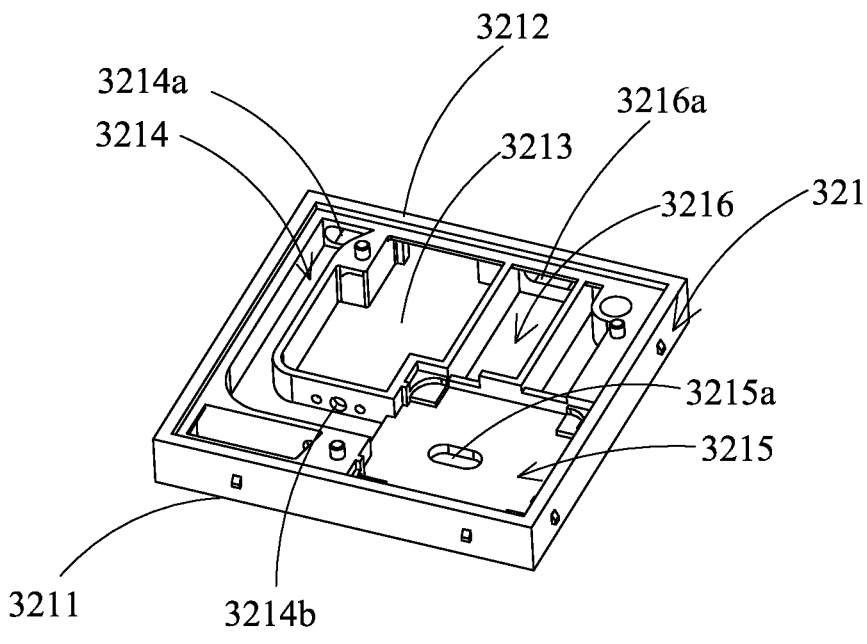
FIG. 5B illustrates a perspective view (2) of the base of the gas detection device of the system for detecting, positioning, and cleaning indoor air pollution of the exemplary embodiment in the present invention.
Figure 6:
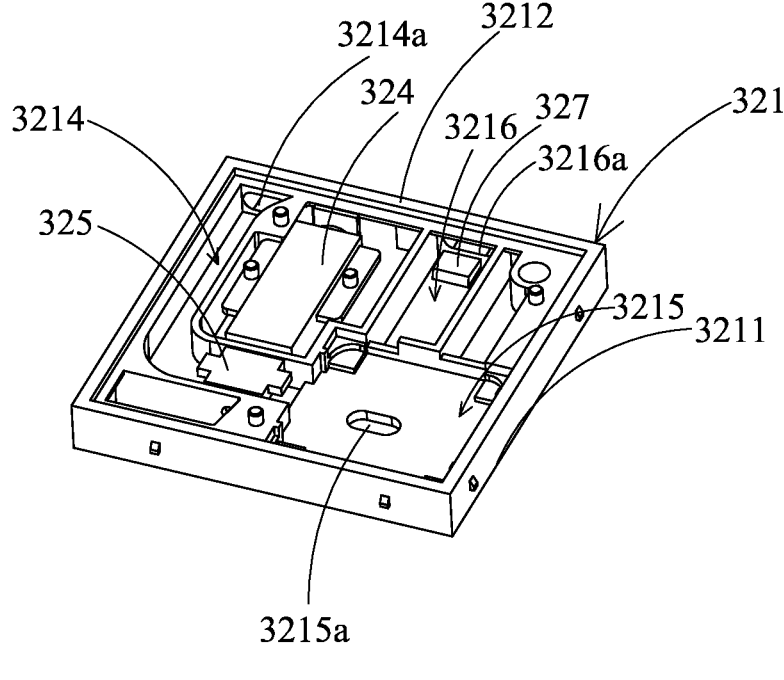
FIG. 6 illustrates a perspective view (3) of the base of the gas detection device of the system for detecting, positioning, and cleaning indoor air pollution of the exemplary embodiment in the present invention.
Figure 7A:
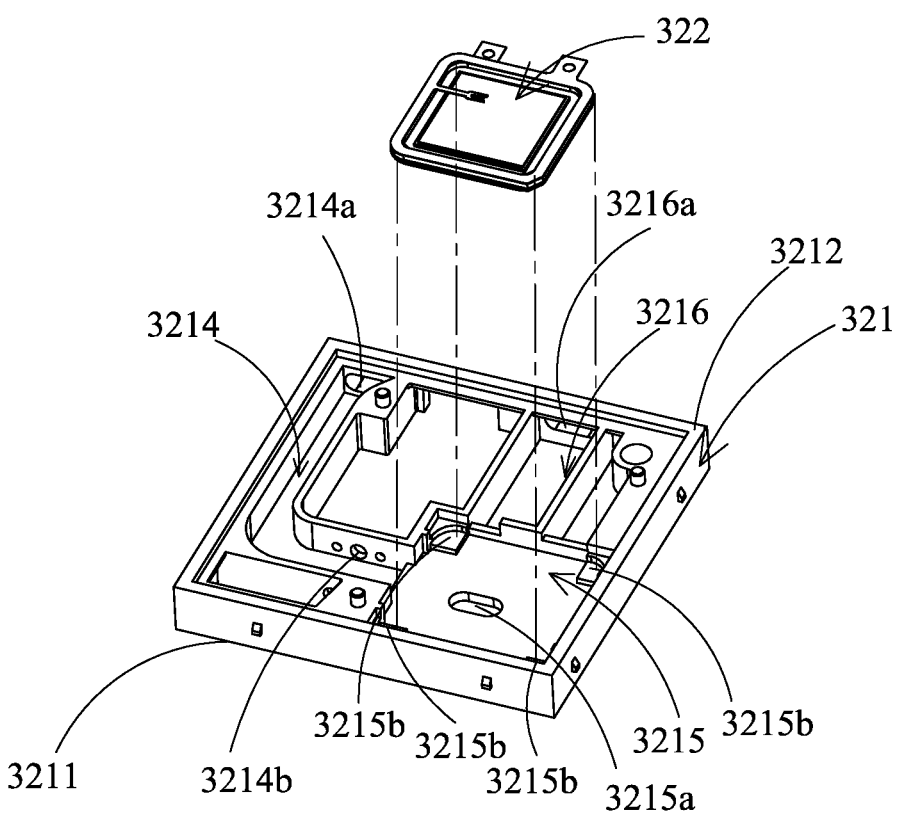
FIG. 7A illustrates an exploded view of a piezoelectric actuator separating from the base of the gas detection device of the system for detecting, positioning, and cleaning indoor air pollution of the exemplary embodiment in the present invention.
Figure 7B:
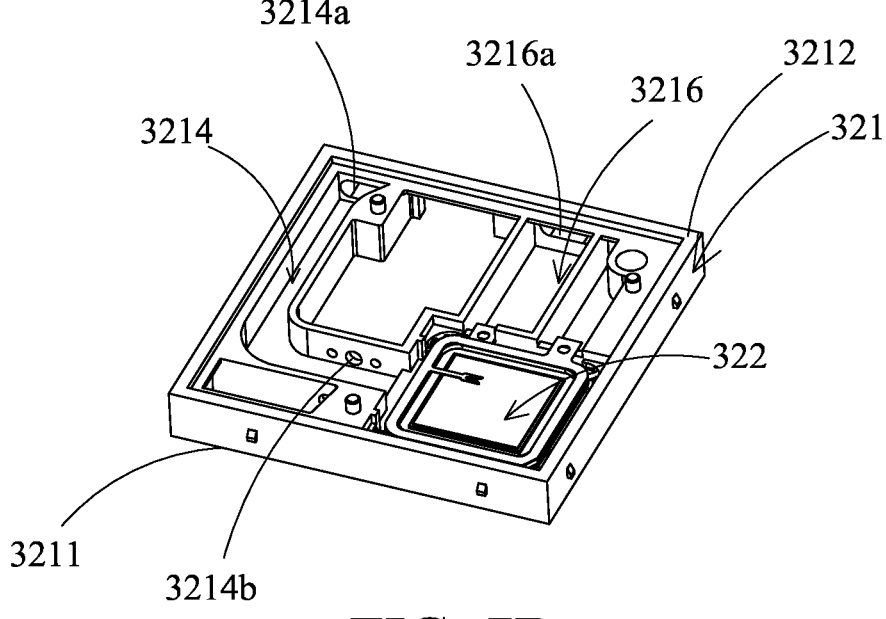
FIG. 7B illustrates a perspective view of the base in combination with the piezoelectric actuator of the gas detection device of the system for detecting, positioning, and cleaning indoor air pollution of the exemplary embodiment in the present invention.

Please refer to FIG. 1 and FIG. 3A. A blower 1 which is nearest to the location of the air pollution is enabled through a wireless network and artificial intelligent computation to generate a directed air flow, and the directed air flow transfers the air pollution to pass through at least one second device which is physical-typed, chemical-typed, or biological-typed in the indoor space to clean the air pollution. It is noted that, the second device which is physical-typed, chemical-typed, or biological-typed is a filtering device B.

The wireless network and artificial intelligent computation is achieved by connecting a cloud device E to the gas detection device A through a wireless network connection to analyze the air pollution data detected by the gas detection device A, and the cloud device E performs artificial intelligent (AI) computation and big data comparison to figure out the location of the air pollution, and the cloud device E intelligently and selectively transmits a control command to the blower 1 or all the second devices which are physical-typed, chemical-typed, or biological-typed to enable the blower 1 through the wireless network, thereby allowing the air pollution in the indoor space to be filtered and cleaned, making the gas (air) of the indoor space be a safe and breathable state.

The qualitative property, the concentration, and the location of the air pollution are the air pollution data detected and ensured by at least one gas detection device A. The wireless network and artificial intelligent computation is achieved by connecting the at least one gas detection device A to the cloud device E through the wireless network connection. The cloud device E is configured to receive and compare the air pollution data in the indoor space detected by the at least one first device which is physical-typed or chemical-typed. The cloud device E performs an intelligent computation on the air pollution data to ensure the qualitative property and the concentration of the air pollution, and the cloud device E performs the intelligent computation to obtain a highest value in the air pollution data so as to figure out the location of the air pollution. The cloud device E intelligently and selectively transmits a control command to a blower 1 or a second device nearest to the location of the air pollution to enable the blower 1 or the second device nearest to the location of the air pollution, and the cloud device E further transmits the control command to rest of the blowers 1 or rest of the second devices to generate the directed air flow, so that the directed air flow accelerates the air pollution to move toward the blower 1 or the second device nearest the location of the air pollution to be filtered, thereby allowing the air pollution in the indoor space to be filtered and cleaned and making the gas (air) of the indoor space be a safe and breathable state.

The at least one gas detection device A is connected to the cloud device E through a smart phone, the smart phone is utilized to receive the air pollution data detected by the at least one gas detection device A, and an application program installed in the smart phone is utilized to transmit the air pollution data in the indoor space detected by the at least one gas detection device A to the cloud device E. The cloud device E receives and compares the air pollution data. The location of the air pollution is determined by artificial intelligence. The cloud device E intelligently and selectively transmits the control command to the blower 1 nearest to the location of the air pollution through communication transmission to enable the blower 1 nearest to the location of the air pollution to generate the directed air flow, and the air pollution is transferred to the at least one second device so as to be filtered and cleaned.

It should be noted that, in embodiments of the present invention, the filtering device B being physical-typed, chemical-typed or the biological-typed may be a refresh air ventilation device B1, an air cleaner B2, a ventilator B3, a cooker hood B4, or an electric fan B5, but the present invention is not limited thereto. The type and the number of the blower 1 and the filtering device B are not limited; that is, the system may include one or more blowers 1 and one or more filtering devices B.

Please refer to FIG. 1. It should be noted that, for instance, in the case that the pollution source is nearby the air cleaner B2, the gas detection device A of the first device nearby the air cleaner B2 detects a higher concentration of the air pollution by the air guided by the blade blower C as compared with the concentration of the air pollution detected by the gas detection devices A of other devices (such as the refresh air ventilation device B1, the ventilator B3, the cooker hood B4, or the electric fan B5) so as to ensure the qualitative property, the concentration, and the location of the air pollution. The cloud device E intelligently and selectively transmits the control command to the blower 1 near the air cleaner B2 to enable the blower 1 nearby the air cleaner B2, and the cloud device E further transmits the control command to rest of the blowers 1 of other devices (such as the refresh air ventilation device B1, the ventilator B3, the cooker hood B4, or the electric fan B5). After the blowers 1 are enabled, the air pollution is filtered and cleaned physically, chemically, or biologically in the filtering unit 2.

Furthermore, take another embodiment for example, while the pollution source is nearby the electric fan B5, the gas detection device A of the first device nearby the electric fan B5 detects a higher concentration of the air pollution from the air guided by the blade blower C as compared with the concentration of the air pollution detected by the gas detection devices A of other devices (such as the refresh air ventilation device B1, the air cleaner B2, the ventilator B3, or the cooker hood B4) so as to ensure the qualitative property, the concentration, and the location of the air pollution. The smart phone is utilized to receive the air pollution data in the indoor space detected by the gas detection device A, and the air pollution data is transmitted to the cloud device E. The cloud device E receives and compares the air pollution data detected by the gas detection device A. The location of the air pollution is determined by artificial intelligence. The cloud device E intelligently and selectively transmits the control command to the blower 1 nearby the electric fan B5, and the cloud device E further transmits the control command to rest of the blowers 1 of other devices (such as the refresh air ventilation device B1, the air cleaner B2, the ventilator B3, or the cooker hood B4). After the blowers 1 are enabled, the air pollution is filtered and cleaned physically, chemically, or biologically in the filtering unit 2.

For further definition of the air pollution (namely the polluted gas or polluted air) as mentioned in the above embodiments, the air pollution may include at least one selected from the group consisting of particulate matters, carbon monoxide ($CO$), carbon dioxide ($CO_2$), ozone ($O_3$), sulfur dioxide ($SO_2$), nitrogen dioxide ($NO_2$), lead (Pb), total volatile organic compounds (TVOC), formaldehyde (HCHO), bacteria, fungi, viruses, and any combination thereof.

Please refer to FIG. 2 and FIG. 3A, the first device which is physical-typed or chemical-typed is a gas detection device A and the second device which is physical-typed or chemical-typed or biological-typed is a filtering device B. In the following description, the first device which is physical-typed or chemical-typed is referred to as the gas detection device A, and the second device which is physical-typed or chemical-typed or biological-typed is referred to as the filtering device B. A plurality of gas detection devices A is configured in the indoor space to detect the qualitative property and the concentration of the air pollution. Each of the gas detection devices A detects the air pollution and outputs the air pollution data, and the mathematical computation and artificial intelligent computation can be performed to ensure the location of the air pollution. The mathematical computation and artificial intelligent computation is achieved by connecting the gas detection devices A to the cloud device E, and the cloud device E performs artificial intelligent (AI) computation and big data comparison on the air pollution data detected by the gas detection device A to figure out the location of the air pollution in the indoor space. The cloud device E intelligently and selectively transmits a control command to the blower 1 or all the second devices which are physical-typed, chemical-typed, or biological-typed to enable the blower 1 or the filtering device B which is physical-typed or chemical-typed or biological-typed. In other words, in this embodiment, the air pollution data detected by the gas detection devices A are compared with each other through intelligent computation so as to infer the location of the air pollution, and the control command is transmitted to the blower 1 or other filtering devices B which are physical-typed or chemical-typed or biological-typed through communication transmission to enable the blower 1 or the filtering device B. Each of the filtering devices B which are physical-typed or chemical-typed or biological-typed includes at least one filtering unit 2, wherein the blower 1 has the ability of transmitting the air bi-directionally, including the extraction and ejection. Moreover, with respect to the indication of the path of the air flow (the arrow shown in the figures indicates the direction of the air flow), the blower 1 may be disposed in front of the filtering unit 2 or behind the filtering unit 2, also the blowers 1 may be disposed in front of and behind the filtering component 2 (as shown in FIG. 3A) simultaneously. Accordingly, the blower 1 can be adjusted and modified according to any practical scenario by the person in the art.

It should be noted that, in embodiments of the present invention, the wireless network and artificial intelligent computation is achieved by connecting the at least one gas detection device A to the cloud device E through the wireless network connection. The cloud device E is configured to receive and compare the air pollution data in the indoor space detected by the at least one gas detection device A. The location of the air pollution is determined by artificial intelligence, then the cloud device E intelligently and selectively transmits a control command to a blower 1 nearest to the location of the air pollution to enable the blower 1 to generate the directed air flow, thereby the directed air flow transmits the air pollution to pass through the filtering device B which is physical-typed or chemical-typed or biological-typed to clean the air pollution.

Furthermore, the gas detection devices A are connected to the cloud device E through a smart phone, the smart phone is utilized to receive the air pollution data in the indoor space detected by the gas detection devices A, and an application program (APP) installed in the smart phone is utilized to transmit the air pollution data in the indoor space detected by the gas detection device to the cloud device E. The cloud device E receives and compares the air pollution data, and the location of the air pollution is determined by artificial intelligence. The cloud device E intelligently and selectively transmits the control command to the blower 1 nearest to the location of the air pollution through communication transmission to enable the blower 1 to generate the directed air flow, and the air pollution is transferred to at least one filtering device B which is physical-typed, chemical-typed or biological-typed to clean the air pollution.

It should be noted that, in embodiments of the present invention, the filtration and clean of the air pollution is defined as filtering the air pollution to allow the air pollution data to be lowered to an air pollution safety detection value, or even to allow the air pollution to approach to zero (a non-detection state), making the gas (air) of the indoor space be a safe and breathable state. In some embodiments, the air pollution safety detection value includes at least one selected from the group consisting of a concentration of PM2.5 which is less than 10 $\mu g/m^3$, a concentration of carbon dioxide which is less than 1000 ppm, a concentration of total volatile organic compounds which is less than 0.56 ppm, a concentration of formaldehyde which is less than 0.08 ppm, a colony-forming unit per cubic meter of bacteria which is less than 1500 $CFU/m^3$, a colony-forming unit per cubic meter of fungi which is less than 1000 $CFU/m^3$, a concentration of sulfur dioxide which is less than 0.075 ppm, a concentration of nitrogen dioxide which is less than 0.1 ppm, a concentration of carbon monoxide which is less than 9 ppm, a concentration of ozone which is less than 0.06 ppm, a concentration of lead which is less than 0.15 $\mu g/m^3$, and any combination thereof.

It should be noted that, as shown in FIG. 3B, in this embodiment, the filtering device B is a physical-typed filtering device, and the filtering unit 2 of the filtering device B filters the air pollution physically by a filter to block and absorb the air pollution. In some embodiments, the filter is a high-efficiency particulate air filter 2a for absorbing the chemical smog, bacteria, dusts, particles, and pollens contained in the polluted gas, thereby the polluted gas introduced into the system can be filtered and purified. In one or some embodiments, the filtering device B is a chemical-typed filtering device, and the filtering unit 2 of the filtering device B filters the air pollution chemically by applying a degradation layer 21 on the filtering unit 2. In some embodiments, the degradation layer 21 may be an activated carbon 21a for filtering organic and inorganic substances and for filtering colored or odor substances. In some embodiments, the degradation layer 21 may be a cleansing factor layer 21b having chlorine dioxide for suppressing viruses, bacteria, fungus, influenza A virus, influenza B virus, Enterovirus, and Norovirus in the polluted gas introduced into the system. Accordingly, the suppressing rate may exceed 99%, allowing the reduction of the cross infections of the viruses. In some embodiments, the degradation layer 21 may be an herbal protection coating layer 21c including the extracts of *Rhus chinensis* Mill (may be *Rhus chinensis* Mill from Japan) and the extracts of *Ginkgo biloba* to efficiently perform anti-allergy function and destroy cell surface proteins of influenza viruses (e.g., influenza virus subtype H1N1). In some embodiments, the degradation layer 21 may be a layer of silver ions 21d for suppressing viruses, bacteria, and fungus in the polluted gas introduced into the system. In some embodiments, the degradation layer 21 may be a zeolite mesh 21e for removing ammonia, heavy metals, organic pollutants, Escherichia coli, phenol, chloroform, or anion surfactants. In some embodiments, the filtering device B is a chemical-typed filtering device, and the filtering unit 2 of the filtering device B filters the air pollution chemically along with a degradation unit 23. In some embodiments, the degradation unit 23 is a negative ion unit 23a; through applying high voltage discharging to the introduced polluted gas, the particulates carry with positive charges in the polluted gas are adhered to the negative charges on the negative ion unit 23a. In some embodiments, the degradation unit 23 is a plasma ion unit 23b; when the polluted gas is introduced into the system, the oxygen molecules and the water molecules in the polluted gas are ionized to generate cations ($H^+$) and anions ($O_2^-$). After the substances attached with water molecules around the ions attach on the surfaces of viruses and bacteria, the water molecules will be converted into oxidative oxygen ions (hydroxyl ions, $OH^-$ ions) with high oxidative power under chemical reaction, resulting in that the oxidative oxygen ions take away the hydrogen ions of the proteins on the surfaces of the viruses and the bacteria so as to oxidize and decompose the viruses and bacteria. In some embodiments, the filtering device B is a biological-typed filtering device, and the filtering unit 2 of the filtering device B filters the air pollution biologically along with a light illumination 22. In some embodiments, the light illumination 22 is a photocatalyst unit including a photocatalyst 22a and an ultraviolet light 22b. When the photocatalyst 22a is illuminated by the ultraviolet light 22b, the light energy is converted into electrical energy in order to degrade the hazardous matters in the polluted gas to achieve the effect of filtration and purification. In some embodiments, the light illumination 22 is a photo plasma unit including a nanometer light tube 22c. The introduced polluted gas is illuminated by the nanometer light tube, making the oxygen molecules and water molecules in the polluted gas decompose into photo plasma with high oxidative power for generating a plasma flow which is capable of destroying the organic molecules. Accordingly, volatile organic compounds (VOC) such as formaldehyde and toluene in the polluted gas can be decomposed into water and carbon dioxide. Therefore, the introduced gas can be filtered and cleaned.

To illustrate the embodiments of the present invention clearly, the detail structure of the gas detection device A is illustrated as below.

According to one or some embodiments of the present invention, the gas detection device A will be indicated by reference number 3 in the descriptions below. Please refer to FIG. 4A to FIG. 11. The gas detection device 3 includes a control circuit board 31, a gas detection main body 32, a microprocessor 33, and a communication device 34. The gas detection main body 32, the microprocessor 33, and the communication device 34 are integrally packaged with the control circuit board 31 and electrically connected to each other. The microprocessor 33 and the communication device 34 are disposed on the control circuit board 31, and the microprocessor 33 controls a driving signal of the gas detection main body 32 to enable the operation of the gas detection main body 32, so that the gas detection main body 32 detects the air pollution and outputs a detection signal, and the microprocessor 33 receives the detection signal so as to compute, process, and output the air pollution data, therefore the microprocessor 33 provides the communication device 34 with the air pollution data for wirelessly transmitting outwardly to a connection device. The wireless communication is implemented by using one of a Wi-Fi module, a Bluetooth module, a radiofrequency identification (RFID) module, and a near field communication module.

Please refer to FIG. 4A to FIG. 9A. In one or some embodiments, the gas detection main body 32 includes a base 321, a piezoelectric actuator 322, a driving circuit board 323, a laser component 324, a particulate sensor 325, and an outer cover 326. The base 321 has a first surface 3211, a second surface 3212, a laser installation region 3213, a gas inlet groove 3214, a gas-guiding component installation region 3215, and a gas outlet groove 3216. The first surface 3211 and the second surface 3212 are opposite to each other. The laser installation region 3213 is formed by hollowing out the base 321 from the first surface 3211 to the second surface 3212 for accommodating the laser component 324. The outer cover 326 covers the base 321 and has a side plate 3261. The side plate 3261 has a gas inlet opening 3261a and a gas outlet opening 3261b. The gas inlet groove 3214 is recessed from the second surface 3212 and located adjacent to the laser installation region 3213. The gas inlet groove 3214 has a gas inlet through hole 3214a and two lateral walls. The gas inlet through hole 3214a is in communication with the outside environment of the base 321 and is corresponding to the gas inlet opening 3261a of the outer cover 326. Two light penetration windows 3214b penetrate the two lateral walls of the gas inlet groove 3214 and are in communication with the laser installation region 3213. Therefore, when the first surface 3211 of the base 321 is covered by the outer cover 326, and the second surface 3212 of the base 321 is covered by the driving circuit board 323, a gas inlet path can be defined by the gas inlet groove 3214.

The gas-guiding component installation region 3215 is recessed from the second surface 3212 and in communication with the gas inlet groove 3214. A ventilation hole 3215a penetrates a bottom surface of the gas-guiding component installation region 3215. Each of the four corners of the gas-guiding component installation region 3215 has a positioning bump 3215b. The gas outlet groove 3216 has a gas outlet through hole 3216a, and the gas outlet through hole 3216a is corresponding to the gas outlet opening 3261b of the outer cover 326. The gas outlet groove 3216 includes a first region 3216b and a second region 3216c. The first region 3216b is recessed from a portion of the first surface 3211 corresponding to a vertical projection region of the gas-guiding component installation region 3215. The second region 3216c is at a portion extending from a region that is not corresponding to the vertical projection region of the gas-guiding component installation region 3215, and the second region 3216c is hollowed out from the first surface 3211 to the second surface 3212. The first region 3216b is connected to the second region 3216c to form a stepped structure. Moreover, the first region 3216b of the gas outlet groove 3216 is in communication with the ventilation hole 3215a of the gas-guiding component installation region 3215, and the second region 3216c of the gas outlet groove 3216 is in communication with the gas outlet through hole 3216a. Therefore, when the first surface 3211 of the base 321 is covered by the outer cover 326 and the second surface 3212 of the base 321 is covered by the driving circuit board 323, a gas outlet path can be defined by the gas outlet groove 3216 and the driving circuit board 323.

Furthermore, the laser component 324 and the particulate sensor 325 are disposed on the driving circuit board 323 and located in the base 321. The laser component 324 and the particulate sensor 325 are electrically connected to the driving circuit board 323. It should notice that the driving circuit board 323 is omitted to clearly explain the positions of the laser component 324, the particulate sensor 325, and the base 321. In the embodiment of the present invention, the laser component 324 is located at the laser installation region 3213 of the base 321. The particulate sensor 325 is located at the gas inlet groove 3214 of the base 321 and aligned with the laser component 324. Moreover, the laser component 324 is corresponding to the light penetration windows 3214b so as to allow the light beam emitted by the laser component 324 to pass therethrough and into the gas inlet groove 3214. The light path of the light beam emitted by the laser component 324 passes through the light penetration windows 3214b and is orthogonal to the gas inlet groove 3214. The light beam emitted by the laser component 324 passes into the gas inlet groove 3214 through the light penetration windows 3214b, thereby the particulate matters in the gas inlet groove 3214 is illuminated by the light beam. When the light beam contacts the gas, the light beam will be scattered and generate light spots. Hence, the light spots generated by the scattering are received and calculated by the particulate sensor 325 located at the position orthogonal to the gas inlet groove 3214 to obtain the detection data of the gas. Furthermore, a gas sensor 327 is disposed on the driving circuit board 323 and is located at the gas outlet groove 3216 for detecting the polluted gas introduced into the gas outlet groove 3216, and the gas sensor 327 is electrically connected to the driving circuit board 323. In one embodiment of the present invention, the gas sensor 327 includes at least one selected from the group consisting of a volatile organic compound detector capable of detecting gas information of carbon dioxide ($CO_2$) or total volatile organic compounds (TVOC), a formaldehyde sensor capable of detecting gas information of formaldehyde (HCHO) gas, a bacterial sensor capable of detecting information of bacteria or fungi, and a virus sensor capable of detecting information of viruses, and any combination thereof.

Moreover, the piezoelectric actuator 322 is located at the square-shaped gas-guiding component installation region 3215 of the base 321, and the gas-guiding component installation region 3215 is in communication with the gas inlet groove 3214. When the piezoelectric actuator 322 is enabled, the gas in the gas inlet groove 3214 is inhaled into the piezoelectric actuator 322, passing through the ventilation hole 3215a of the gas-guiding component installation region 3215, and entering the gas outlet groove 3216. Moreover, the driving circuit board 323 covers the second surface 3212 of the base 321. The laser component 324 and the particulate sensor 325 are disposed on the driving circuit board 323 and electrically connected to the driving circuit board 323. As the outer cover 326 covers the base 321, the gas inlet opening 3261a is corresponding to the gas inlet through hole 3214a of the base 321, and the gas outlet opening 3216b is corresponding to the gas outlet through hole 3216a of the base 321.

Furthermore, the piezoelectric actuator 322 includes a nozzle plate 3221, a chamber frame 3222, an actuation body 3223, an insulation frame 3224, and a conductive frame 3225. The nozzle plate 3221 is made by a flexible material and has a suspension sheet 3221a and a hollow hole 3221b. The suspension sheet 3221a is a flexible sheet which can bend and vibrate. The shape and the size of the suspension sheet 3221a approximately corresponding to the inner edge of the gas-guiding component installation region 3215. The hollow hole 3221b penetrates through the center portion of the suspension sheet 3221a for the gas flowing therethrough. In one embodiment of the present invention, the shape of the suspension sheet 3221a can be selected from square, circle, ellipse, triangle, or polygon.

Furthermore, the chamber frame 3222 is stacked on the nozzle plate 3221, and the shape of the chamber frame 3222 is corresponding to the shape of the nozzle plate 3221. The actuation body 3223 is stacked on the chamber frame 3222. A resonance chamber 3226 is collectively defined between the actuation body 3223, the chamber frame 3222, and the suspension sheet 3221a. The insulation frame 3224 is stacked on the actuation body 3223. The appearance of the insulation frame 3224 is similar to the appearance of the chamber frame 3222. The conductive frame 3225 is stacked on the insulation frame 3224. The appearance of the conductive frame 3225 is similar to the appearance of the insulation frame 3224. The conductive frame 3225 has a conductive pin 3225a and a conductive electrode 3225b. The conductive pin 3225a extends outwardly from the outer edge of the conductive frame 3225, and the conductive electrode 3225b extends inwardly from the inner edge of the conductive frame 3225. Moreover, the actuation body 3223 further includes a piezoelectric carrying plate 3223a, an adjusting resonance plate 3223b, and a piezoelectric plate 3223c. The piezoelectric carrying plate 3223a is stacked on the chamber frame 3222, and the adjusting resonance plate 3223b is stacked on the piezoelectric carrying plate 3223a. The piezoelectric plate 3223c is stacked on the adjusting resonance plate 3223b. The adjusting resonance plate 3223b and the piezoelectric plate 3223c are accommodated in the insulation frame 3224. The conductive electrode 3225b of the conductive frame 3225 is electrically connected to the piezoelectric plate 3223c. In one preferred embodiment of the present invention, the piezoelectric carrying plate 3223a and the adjusting resonance plate 3223b are both made of conductive material(s). The piezoelectric carrying plate 3223a has a piezoelectric pin 3223d. The piezoelectric pin 3223d and the conductive pin 3225a are in electrical connection with a driving circuit (not shown) of the driving circuit board 323 to receive a driving signal (which may be a driving frequency and a driving voltage). The piezoelectric pin 3223d, the piezoelectric carrying plate 3223a, the adjusting resonance plate 3223b, the piezoelectric plate 3223c, the conductive electrode 3225b, the conductive frame 3225, and the conductive pin 3225a may together form an electrical circuit for transmitting the driving signal, and the insulation frame 3224 is provided for electrically insulating the conductive frame 3225 from the actuation body 3223 to avoid short circuit, thereby the driving signal can be transmitted to the piezoelectric plate 3223c. When the piezoelectric plate 3223c receives the driving signal, the piezoelectric plate 3223c deforms owing to the piezoelectric effect, and thus the piezoelectric carrying plate 3223a and the adjusting resonance plate 3223b are driven to vibrate in a reciprocating manner.

Moreover, the adjusting resonance plate 3223b is disposed between the piezoelectric plate 3223c and the piezoelectric carrying plate 3223a as a buffering element so as to adjust the vibration frequency of the piezoelectric carrying plate 3223a. Generally, the thickness of the adjusting resonance plate 3223b is greater than the thickness of the piezoelectric carrying plate 3223a. The thickness of the adjusting resonance plate 3223b may be modified to adjust the vibration frequency of the actuation body 3223.

Figure 8A:
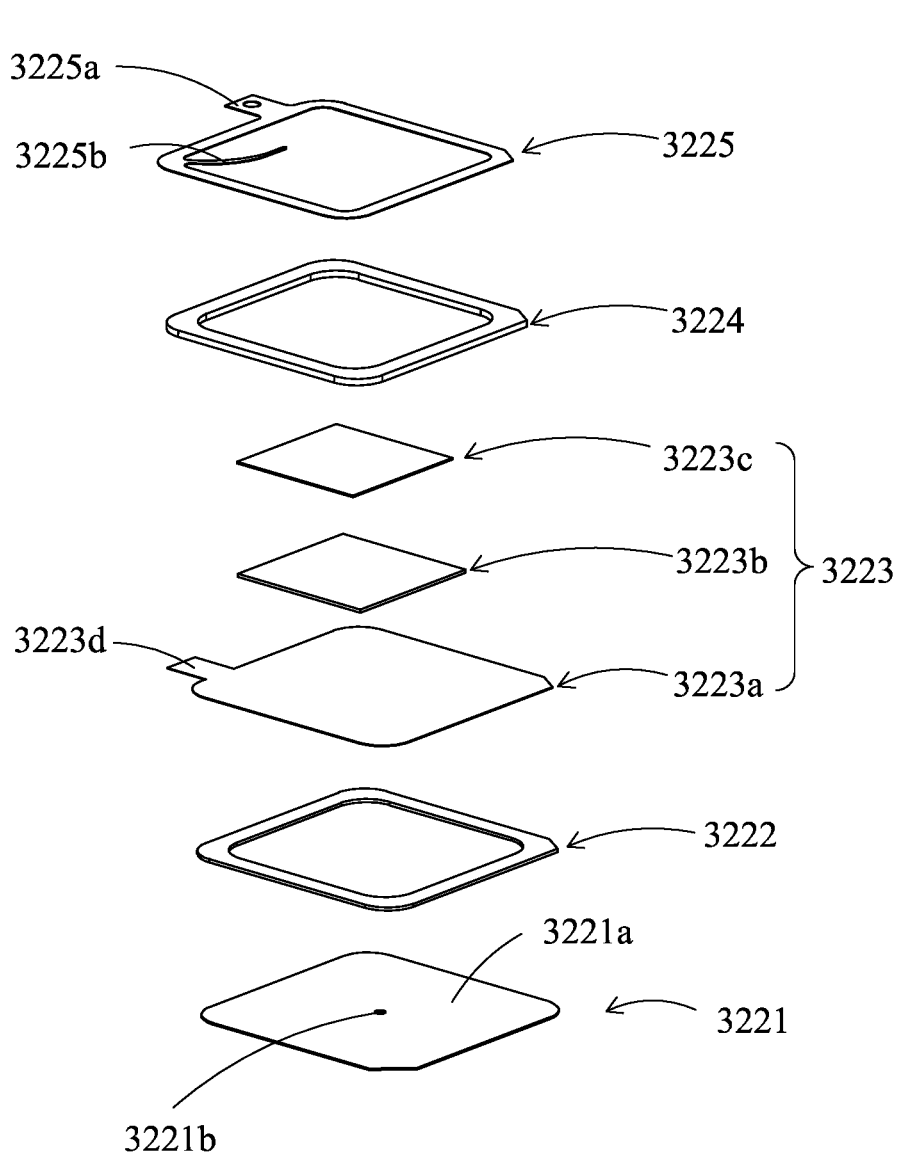
FIG. 8A illustrates an exploded view (1) of the piezoelectric actuator of the gas detection device of the system for detecting, positioning, and cleaning indoor air pollution of the exemplary embodiment in the present invention.
Figure 8B:
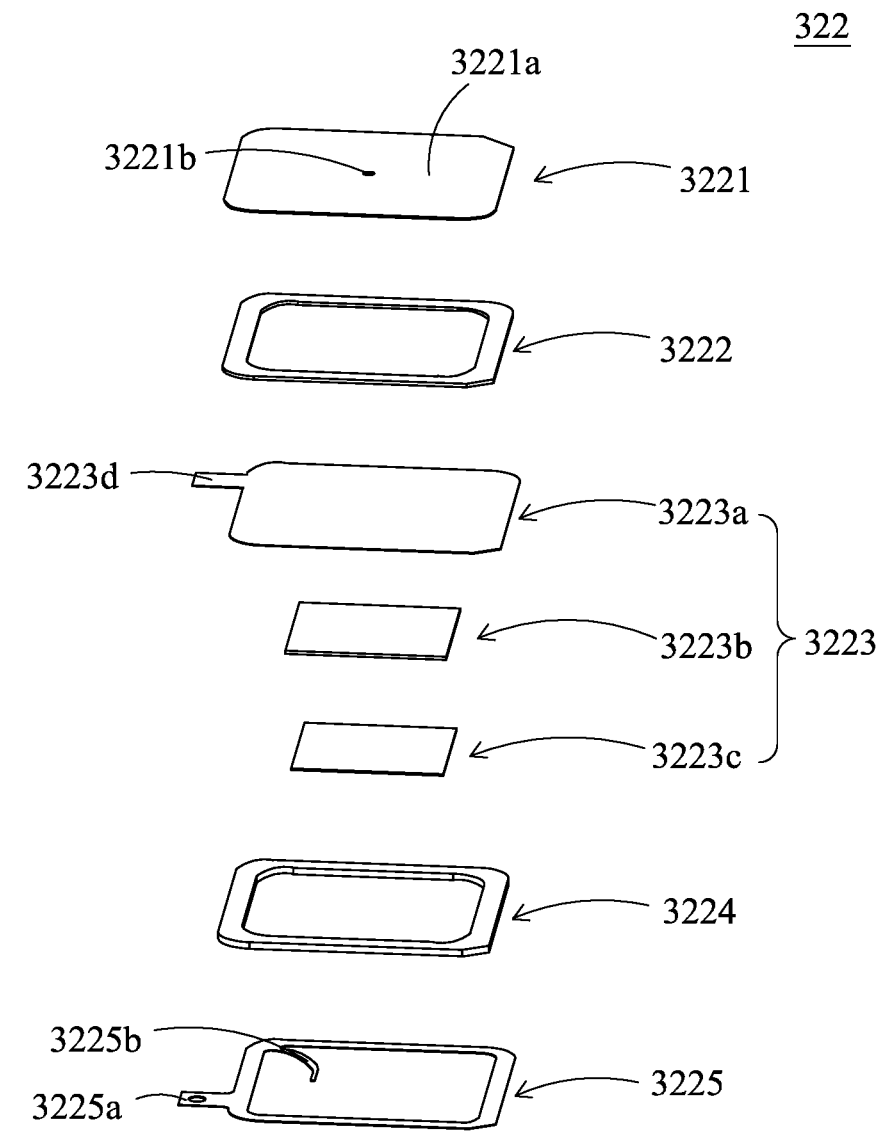
FIG. 8B illustrates an exploded view (2) of the piezoelectric actuator of the gas detection device of the system for detecting, positioning, and cleaning indoor air pollution of the exemplary embodiment in the present invention.
Figure 9A:
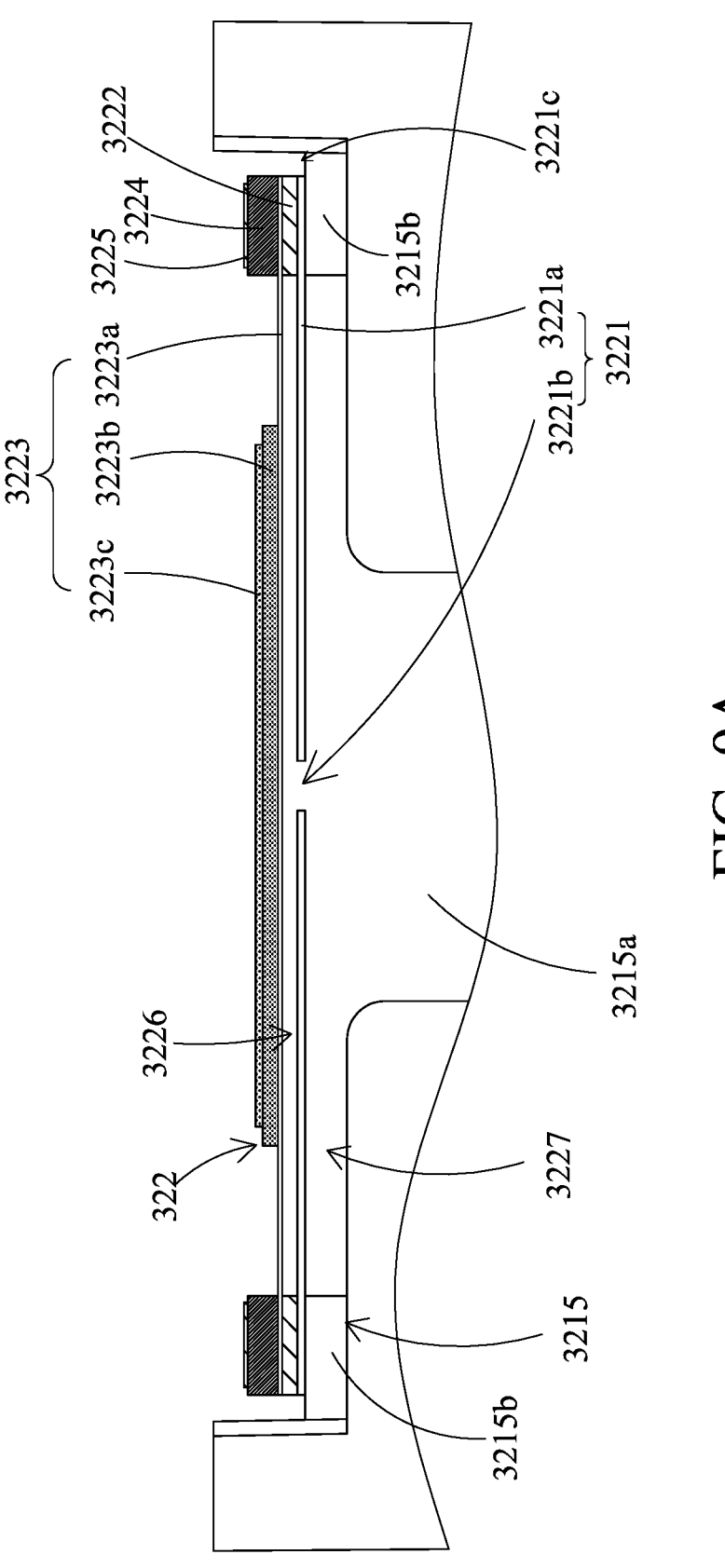
FIG. 9A illustrates a cross-sectional view (1) showing the operation of the piezoelectric actuator of the gas detection device of the system for detecting, positioning, and cleaning indoor air pollution of the exemplary embodiment in the present invention.

Please refer to FIG. 8A, FIG. 8B, and FIG. 9A. The nozzle plate 3221, the chamber frame 3222, the actuation body 3223, the insulation frame 3224, and the conductive frame 3225 are sequentially stacked and assembled and are positioned in the gas-guiding component installation region 3215, thereby a clearance 3221c is defined between the suspension sheet 3221a and the inner edge of the gas-guiding component installation region 3215 for the gas to pass therethrough. A gas flow chamber 3227 is formed between the nozzle plate 3221 and the bottom surface of the gas-guiding component installation region 3215. The gas flow chamber 3227 is in communication with the resonance chamber 3226 formed between the actuation body 3223, the chamber frame 3222, and the suspension sheet 3221a through the hollow hole 3221b of the nozzle plate 3221. In one aspect of the present invention, the resonance chamber 3226 and the suspension sheet 3221a can generate the Helmholtz resonance effect to improve the transmission efficiency of the gas through controlling the vibration frequency of the gas in the resonance chamber 3226 to be close to the vibration frequency of the suspension sheet 3221a. When the piezoelectric plate 3223c moves in a direction away from the bottom surface of the gas-guiding component installation region 3215, the piezoelectric plate 3223c drives the suspension sheet 3221a of the nozzle plate 3221 to move in the direction away from the bottom surface of the gas-guiding component installation region 3215 correspondingly. Hence, the volume of the gas flow chamber 3227 expands dramatically, therefore the internal pressure of the gas flow chamber 3227 decreases and creates a negative pressure, drawing the gas outside the piezoelectric actuator 322 to flow into the piezoelectric actuator 322 through the clearance 3221c and enter the resonance chamber 3226 through the hollow hole 3221b, thereby increasing the gas pressure of the resonance chamber 3226 and thus generating a pressure gradient. When the piezoelectric plate 3223c drives the suspension sheet 3221a of the nozzle plate 3221 to move toward the bottom surface of the gas-guiding component installation region 3215, the gas inside the resonance chamber 3226 is pushed to flow out rapidly through the hollow hole 3221b to further push the gas inside the gas flow chamber 3227, thereby the converged gas can be rapidly and massively ejected out of the gas flow chamber 3227 through the ventilation hole 3215a of the gas-guiding component installation region 3215 in a state closing to an ideal gas state under the Bernoulli's law.

Figure 9B:
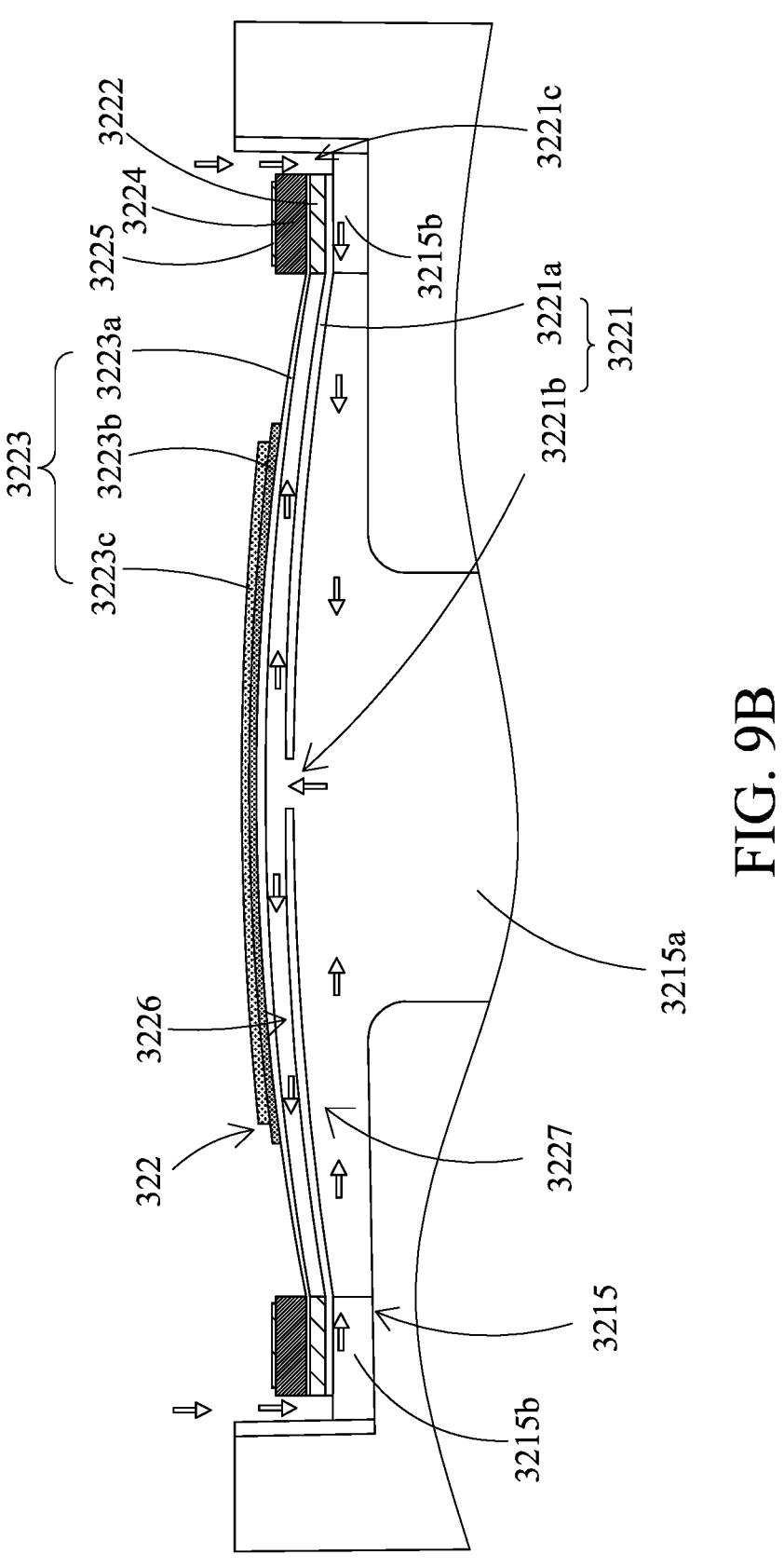
FIG. 9B illustrates a cross-sectional view (2) showing the operation of the piezoelectric actuator of the gas detection device of the system for detecting, positioning, and cleaning indoor air pollution of the exemplary embodiment in the present invention.
Figure 9C:
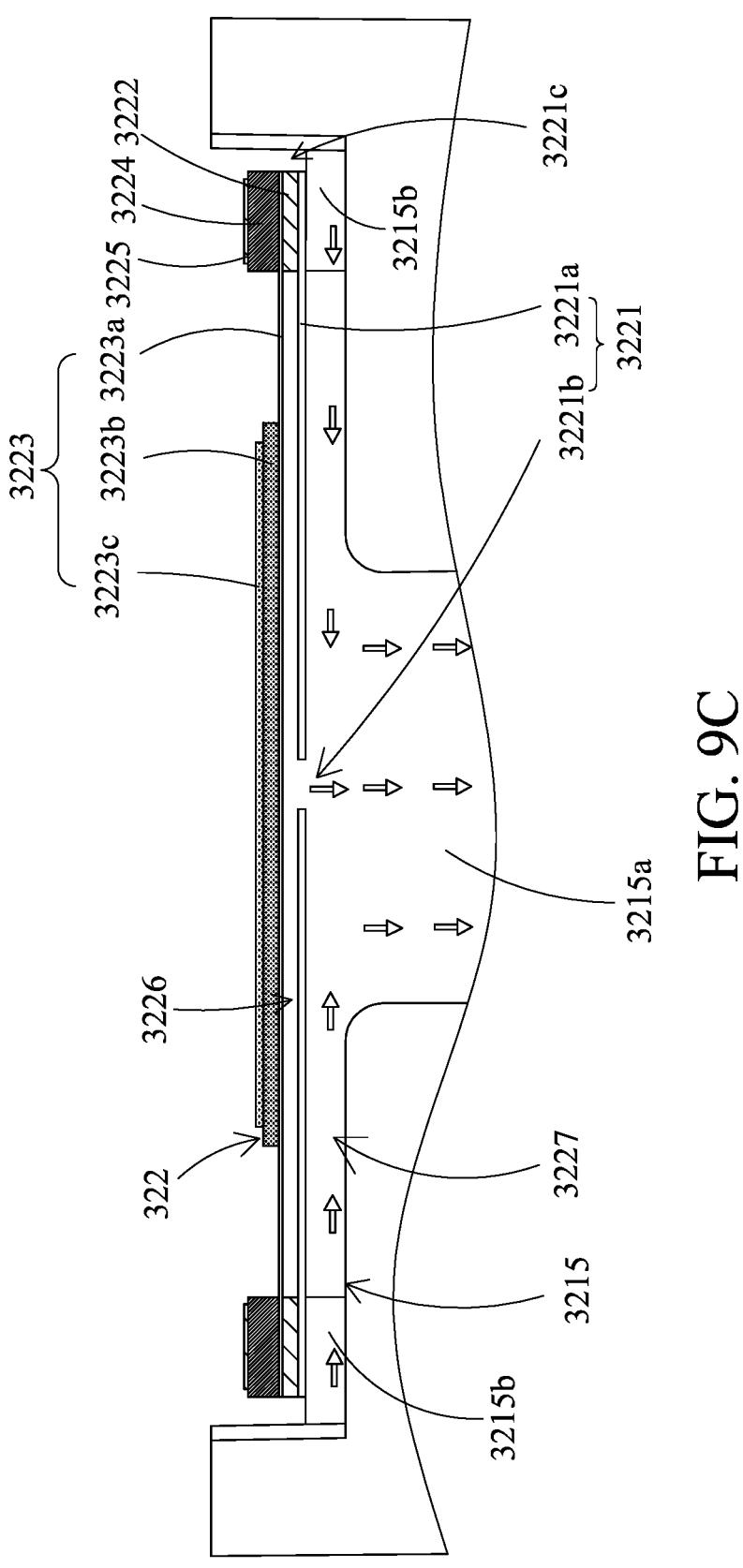
FIG. 9C illustrates a cross-sectional view showing the operation (3) of the piezoelectric actuator of the gas detection device of the system for detecting, positioning, and cleaning indoor air pollution of the exemplary embodiment in the present invention.
Figure 10A:
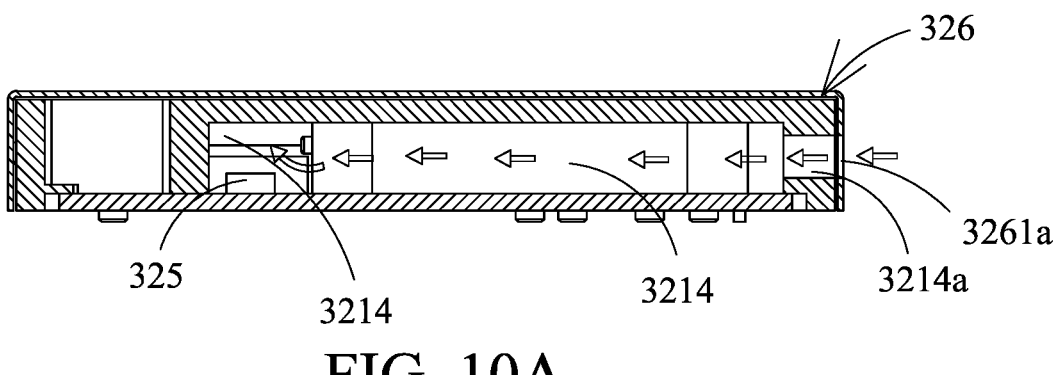
FIG. 10A illustrates a cross-sectional view (1) of the gas detection main body of the gas detection device of the system for detecting, positioning, and cleaning indoor air pollution of the exemplary embodiment in the present invention.
Figure 10B:
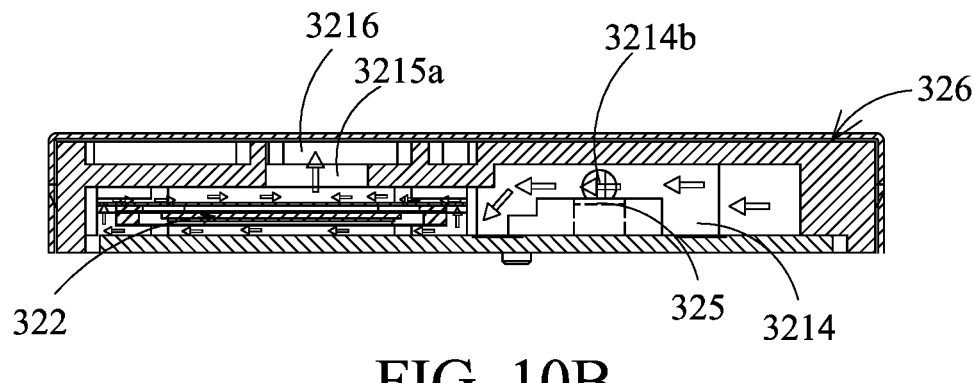
FIG. 10B illustrates a cross-sectional view (2) of the gas detection main body of the gas detection device of the system for detecting, positioning, and cleaning indoor air pollution of the exemplary embodiment in the present invention.
Figure 10C:
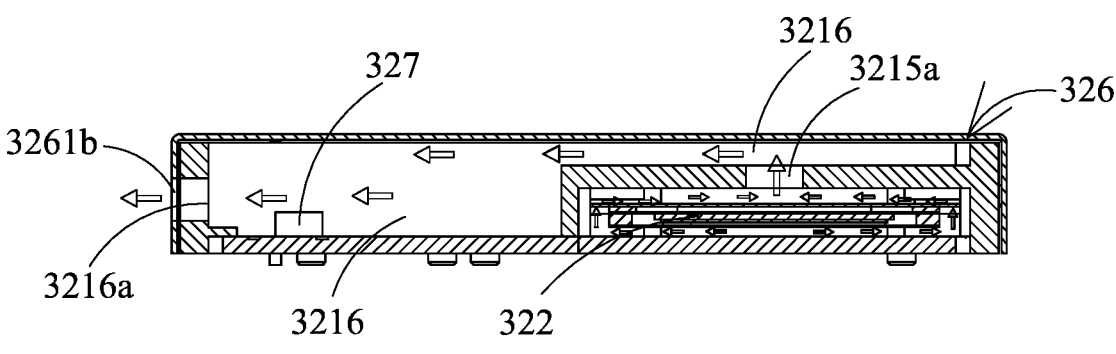
FIG. 10C illustrates a cross-sectional view (3) of the gas detection main body of the gas detection device of the system for detecting, positioning, and cleaning indoor air pollution of the exemplary embodiment in the present invention.
Figure 11:
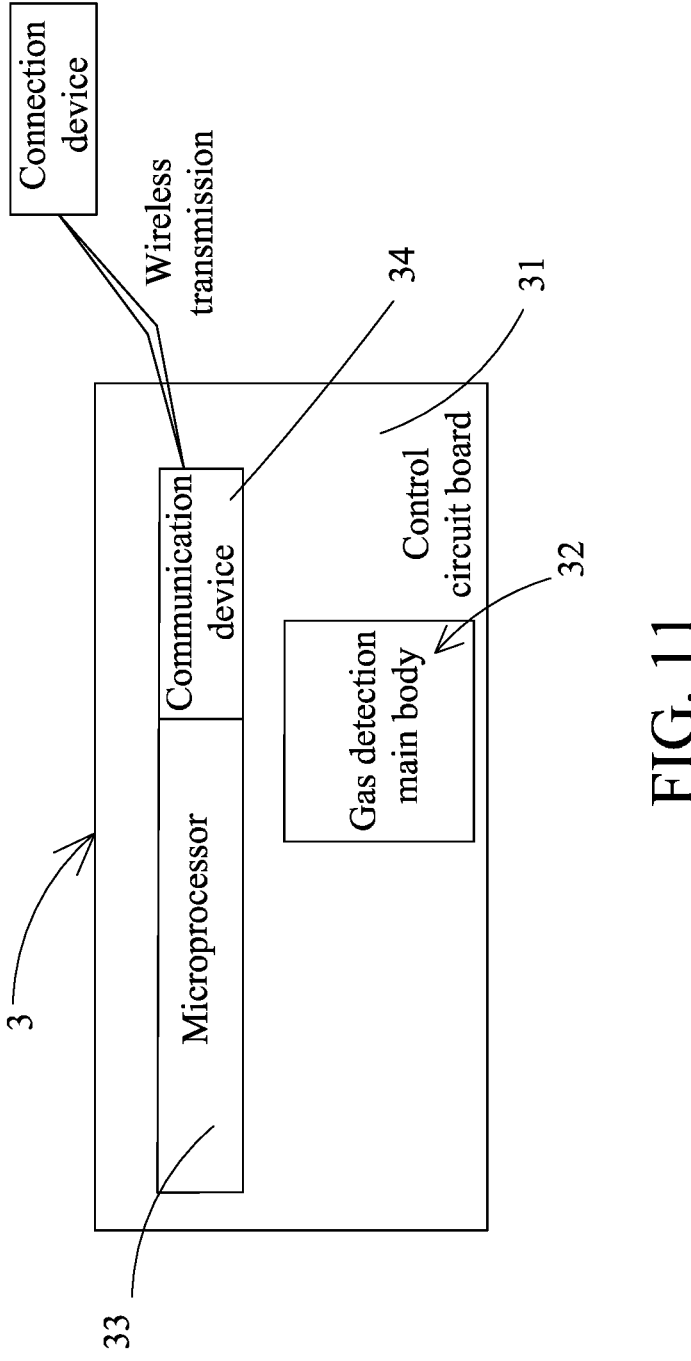
FIG. 11 illustrates a schematic view showing the transmission of the gas detection device of the system for detecting, positioning, and cleaning indoor air pollution of the exemplary embodiment in the present invention.

Therefore, through repeating the steps as shown in FIG. 9B and FIG. 9C, the piezoelectric plate 3223c can bend and vibrate in a reciprocating manner. Further, after the gas is discharged out of the resonance chamber 3226, the internal pressure of the resonance chamber 3226 is lower than the equilibrium pressure due to the inertia, as a result, the pressure difference guides the gas outside the resonance chamber 3226 into the resonance chamber 3226 again. Therefore, through controlling the vibration frequency of the gas in the resonance chamber 3226 to be close to the vibration frequency of the piezoelectric plate 3223*c*, the resonance chamber 3226 and the piezoelectric plate 3223*c* can generate the Helmholtz resonance effect so as to achieve effective, high-speed, and large-volume gas transmission of the gas. Moreover, the gas enters the gas detection main body 32 from the gas inlet opening 3261*a* of the outer cover 326, and flows into the gas inlet groove 3214 of the base 321 through the gas inlet through hole 3214*a*, eventually reaching the position of the particulate sensor 325. Furthermore, the piezoelectric actuator 322 continuously drives the gas into the gas inlet path so as to facilitate the gas inside the detection main body 32 to stably and rapidly pass through the particulate sensor 325. Next, the light beam emitted by the laser component 324 passes through the light penetration windows 3214*b*, enters the gas inlet groove 3214, and illuminates the gas in the gas inlet groove 3214 which passes through the particulate sensor 325. When the light beam from the particulate sensor 325 illuminates on the particulate matters in the gas, the light beam will be scattered and generate light spots. The particulate sensor 325 receives and calculates the light spots generated by the scattering to obtain the information of the particulate matters in the gas such as the particle size and the number of the particulate matters. Moreover, the gas passing through the particulate sensor 325 is continuously introduced into the ventilation hole 3215*a* of the gas-guiding component installation region 3215 by the piezoelectric actuator 322 and enters the gas outlet groove 3216. Finally, after the gas enters the gas outlet groove 3216, since the piezoelectric actuator 322 continuously delivers the gas into gas outlet groove 3216, therefore the gas is continuously pushed and discharged out of the gas detection main body 32 through the gas outlet through hole 3216*a* and the gas outlet opening 3261*b*.

In some embodiments, the gas detection device A not only can detect the particulate matters in the gas, but also can obtain the property of the gas introduced into the gas detection device 3. For example, the gas may be formaldehyde, ammonia, carbon monoxide, carbon dioxide, oxygen, ozone, or the like. Therefore, the gas detection device A further includes a gas sensor 327. The gas sensor 327 is disposed on the driving circuit board 323 and is located at the gas outlet groove 3216 for detecting the polluted gas introduced into the gas outlet groove 3216, and the gas sensor 327 is electrically connected to the driving circuit board 323. Therefore, the gas sensor 327 can obtain the concentration or the property of the volatile organic compounds contained in the gas from the gas outlet path.

As above, one or some embodiments of the present invention provides a system for detecting, positioning, and cleaning indoor air pollution. Because the air pollution in the indoor space is occurring and moving any time, a plurality of gas detection devices being physical-typed or chemical-typed is widely configured in the indoor space to ensure the qualitative property, the concentration, and the location of the air pollution. Moreover, a cloud device is connected to the gas detection devices through wired or wireless connection to perform mathematical computation and artificial intelligent computation to ensure the location of the air pollution, the cloud device intelligently and selectively transmits enables a physical-typed, chemical-typed, or biological-typed filtering device which is nearest to the location of the air pollution to generate an air flow, so that the air pollution is guided to the filtering device for being filtered and cleaned, and therefore positioning the air pollution, guiding the air pollution, and cleaning the air pollution can be achieved, allowing the air pollution in the indoor space to be cleaned to a safe and breathable state.

The foregoing outlines features of several embodiments so that those skilled in the art may better understand the aspects of the present invention. Those skilled in the art should appreciate that they may readily use the present invention as a basis for designing or modifying other processes and structures for carrying out the same purposes and/or achieving the same advantages of the embodiments introduced herein. Those skilled in the art should also realize that such equivalent constructions do not depart from the spirit and scope of the present invention, and that they may make various changes, substitutions, and alterations herein without departing from the spirit and scope of the present invention.

What is claimed is:

1. A system for detecting, positioning, and cleaning indoor air pollution comprising:

a plurality of first devices being physical-typed or chemical-typed, and the plurality of first devices are gas detection devices;

a plurality of second devices being physical-typed, chemical-typed, or biological-typed, wherein each of the second devices are configured in an indoor space and comprises one of the first devices, a blade blower and a blower;

wherein each of the blade blowers of the second devices is configured to provide an air flow, to inhale a gas, and to collect an air pollution in the gas, wherein the each of the blade-blowers of the plurality of second devices transmits the air pollution to the first device correspondingly inside the plurality of the second devices through the air flow to detect and ensure a qualitative property, a concentration, and a location of the air pollution;

enabling the blower which is nearest to the location of the air pollution through a wireless network and artificial intelligent computation to generate a directed air flow, wherein the wireless network and artificial intelligent computation is achieved by connecting the gas detection devices to a cloud device through a wireless network connection; the cloud device is configured to receive and compare the air pollution data in the indoor space detected by the plurality of the first devices, the cloud device performs an intelligent computation on the air pollution data to ensure the qualitative property and the concentration of the air pollution, and the cloud device performs the intelligent computation to obtain a highest value in the air pollution data so as to figure out the location of the air pollution; the cloud device intelligently and selectively transmits a control command to the blower of one of the second devices nearest to the location of the air pollution to enable the blower or of the plurality of the second device nearest to the location of the air pollution, and the cloud device further transmits the control command to the rest of the blowers of the rest of the plurality of the second devices to generate the directed air flow, so that the directed air flow accelerates the air pollution to move toward the one of the plurality of the second devices nearest the location of the air pollution to be filtered, thereby allowing the air pollution in the indoor space to be filtered and cleaned and making the gas of the indoor space be a safe and breathable state.

2. The system for detecting, positioning, and cleaning indoor air pollution according to claim 1, wherein the at least one of the air pollutions comprises at least one selected from the group consisting of particulate matters, carbon monoxide, carbon dioxide, ozone, sulfur dioxide, nitrogen dioxide, lead, total volatile organic compounds, formaldehyde, bacteria, fungi, viruses, and any combination thereof.

3. The system for detecting, positioning, and cleaning indoor air pollution according to claim 1, wherein the at least one blade blower is an axial-flow fan.

4. The system for detecting, positioning, and cleaning indoor air pollution according to claim 1, wherein the at least one blade blower is a vortex fan.

5. The system for detecting, positioning, and cleaning indoor air pollution according to claim 1, wherein the at least one blade blower comprises an electric motor and blades.

6. The system for detecting, positioning, and cleaning indoor air pollution according to claim 1, wherein the gas detection device comprises a control circuit board, a gas detection main body, a microprocessor, and a communication device; the gas detection main body, the microprocessor, and the communication device are integrally packaged and electrically connected to the control circuit board; the microprocessor controls the operation of the gas detection main body, the gas detection main body detects the air pollution and output a detection signal, and the microprocessor receives the detection signal to perform computation to generate an air pollution data and provides the air pollution data to the communication device outwardly through a wireless communication.

7. The system for detecting, positioning, and cleaning indoor air pollution according to claim 6, wherein the wireless communication is implemented by using one of a Wi-Fi module, a Bluetooth module, a radiofrequency identification module, and a near field communication module.

8. The system for detecting, positioning, and cleaning indoor air pollution according to claim 1, wherein the gas detection device is connected to the cloud device through a smart phone, the smart phone is utilized to receive the air pollution data detected by the gas detection device, and an application program installed in the smart phone is utilized to transmit the air pollution data in the indoor space detected by the gas detection device to the cloud device; the cloud device receives and compares the air pollution data, and the location of the air pollution is determined by artificial intelligence; the cloud device transmits the control command to the blower nearest to the location of the air pollution through communication transmission to enable the blower nearest to the location of the air pollution to generate the directed air flow, and the air pollution is transferred to at least one second device of the second devices so as to be filtered and cleaned.

9. The system for detecting, positioning, and cleaning indoor air pollution according to claim 1, wherein the at least one second device is a filtering device.

10. The system for detecting, positioning, and cleaning indoor air pollution according to claim 9, wherein the at least one second device is a filtering device which is physical-typed, and the filtering device filters the air pollution physically by utilizing a filter to block and absorb the air pollution.

11. The system for detecting, positioning, and cleaning indoor air pollution according to claim 10, wherein the filter is a high-efficiency particulate air filter.

12. The system for detecting, positioning, and cleaning indoor air pollution according to claim 9, wherein the at least one second device is a filtering device which is chemical-typed, and the filtering device filters the air pollution chemically by applying a degradation layer on a filtering unit.

13. The system for detecting, positioning, and cleaning indoor air pollution according to claim 12, wherein the degradation layer comprises at least one selected from the group consisting of an activated carbon, a cleansing factor layer having chlorine dioxide, an herbal protection coating layer including the extracts of *Rhus chinensis* Mill and the extracts of *Ginkgo biloba*, a silver ion, a zeolite mesh, and any combination thereof.

14. The system for detecting, positioning, and cleaning indoor air pollution according to claim 9, wherein the at least one second device is a filtering device which is chemical-typed, and the filtering device filters the air pollution chemically by a filtering unit along with a degradation unit.

15. The system for detecting, positioning, and cleaning indoor air pollution according to claim 14, wherein the degradation unit comprises at least one selected from the group consisting of a negative ion unit, a plasma ion unit, and any combination thereof.

16. The system for detecting, positioning, and cleaning indoor air pollution according to claim 9, wherein the at least one second device is a filtering device which is biological-typed, and the filtering device filters the air pollution chemically by a filtering unit along with a light illumination.

17. The system for detecting, positioning, and cleaning indoor air pollution according to claim 16, wherein the light illumination is a photocatalyst unit comprising a photocatalyst and an ultraviolet light.

18. The system for detecting, positioning, and cleaning indoor air pollution according to claim 16, wherein the light illumination is a photo plasma unit of a nanometer light tube.

* * * * *